United States Patent [19]

Zwick

[11] Patent Number: 4,682,618
[45] Date of Patent: Jul. 28, 1987

[54] CANVAS RETAINING ASSEMBLY FOR CAMPING TRAILER

[75] Inventor: David J. Zwick, Stoystown, Pa.

[73] Assignee: The Coleman Company, Inc., Wichita, Kans.

[21] Appl. No.: 748,238

[22] Filed: Jun. 24, 1985

[51] Int. Cl.[4] ............... E04H 15/08; E04H 15/64; A41F 1/00
[52] U.S. Cl. ............................ 135/89; 135/119; 135/DIG. 9; 24/461; 24/498; 24/512
[58] Field of Search ............. 135/88, 89, 119, DIG. 9, 135/903, 904, 115, 117, 120; 24/461, 489, 498, 512

[56] References Cited

U.S. PATENT DOCUMENTS

| 41,838 | 3/1864 | Frost | 24/498 |
|---|---|---|---|
| 2,423,402 | 7/1947 | Olsen | 135/119 X |
| 2,553,144 | 5/1951 | Olsen | 24/498 X |
| 2,590,297 | 3/1952 | Curtis, II | 24/498 X |
| 2,889,840 | 6/1959 | McIlwaine | 135/119 X |
| 3,172,419 | 3/1965 | Lewis | 135/119 X |
| 3,380,507 | 4/1968 | Bontrager | 135/88 X |
| 3,486,788 | 12/1969 | Benton | 135/119 X |
| 3,513,862 | 5/1970 | Pohl et al. | 135/117 |

Primary Examiner—Robert A. Hafer
Assistant Examiner—D. Neal Muir

[57] ABSTRACT

An attaching assembly for attaching the canvas canopy of a camping trailer to the camping trailer body includes an extruded rail which is mounted on the top of the trailer body. The rail provides a first channel into which the lower edge of the canvas can be inserted and a second channel in which a latch is pivotally mounted. The bottom edge of the canvas is folded around a vinyl seal and secured thereto to provide the canvas with an enlarged hem, and when the hem of the canvas is inserted into the first channel of the rail, the latch can be pivoted to a latching position to prevent withdrawal of the hem from the rail.

12 Claims, 12 Drawing Figures

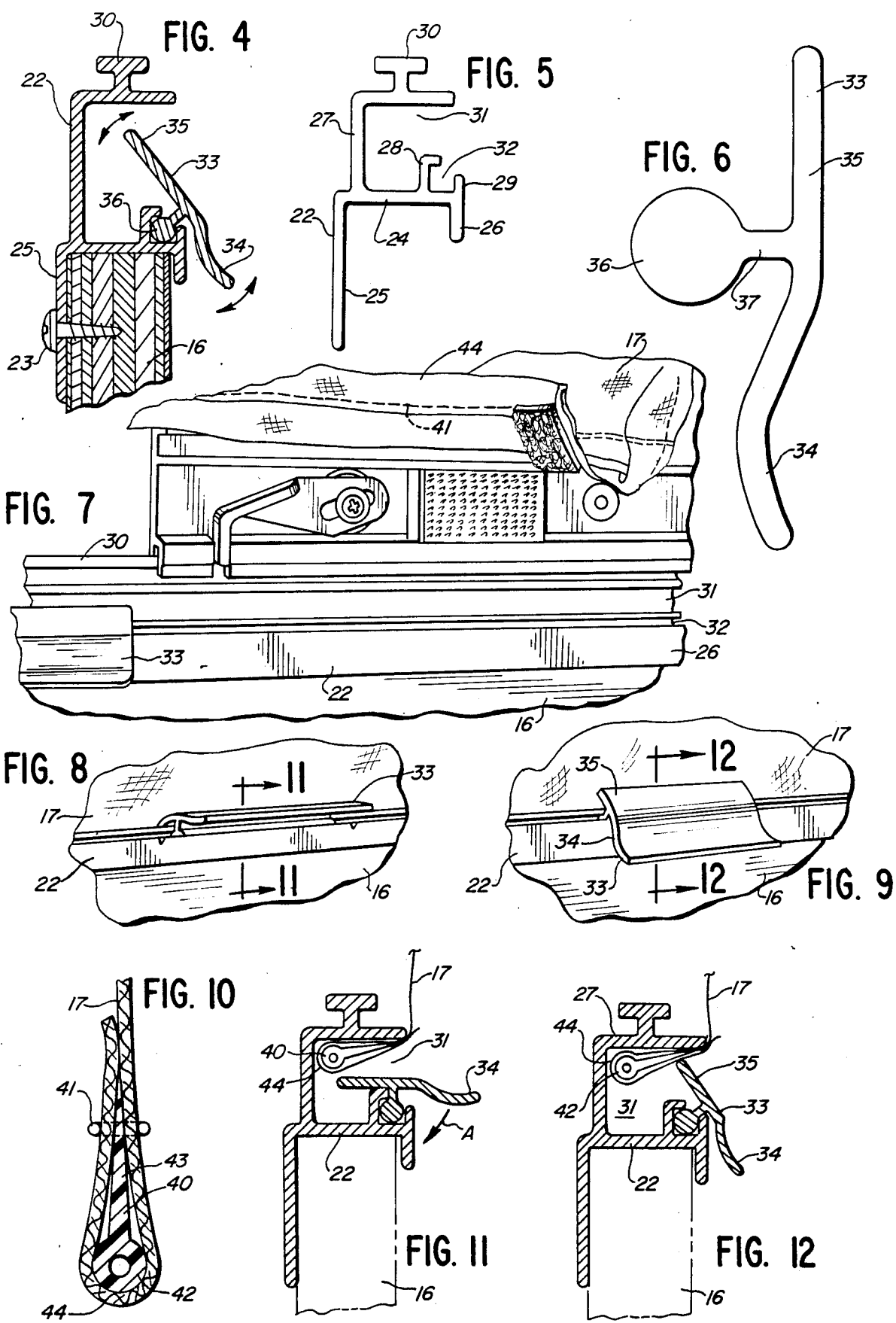

CANVAS RETAINING ASSEMBLY FOR CAMPING TRAILER

BACKGROUND AND SUMMARY

This invention relates to a camping trailer, and, more particularly, to a canvas attaching assembly for a camping trailer or recreational vehicle.

A camping trailer typically includes a rigid body and a tent-like canvas canopy which is supported above the body to form an enclosure. When the camping trailer is not being used, the canopy is folded inside of the trailer body.

Currently, the recreational vehicle industry uses three methods of removably attaching canvas to the body—Velcro strips, flexible vinyl seals, and elastic cords. None of these attaching means is entirely satisfactory. Velcro is quick and easy to attach, but the Velcro strips can be loosened by someone leaning against the canvas or by wind flutter. Vinyl seals provide secure attachment, but can be difficult to insert, especially in colder weather when the vinyl becomes stiff. Elastic cords are quick and easy to attach but requires the canvas to be pulled over an edge for a good seal, and if exposed, they take away from the styling of the product.

The invention includes a vinyl seal that is sewn within the hem on the bottom of the canvas, an extruded channel or rail which is mounted on the trailer body, and latches which are spaced about every 12 to 16 inches on the rail. To attach the canvas, the canvas and vinyl in the hem are inserted into the open side of the channel, and then the latches are rotated to engage the canvas and vinyl and prevent it from pulling out of the channel. To ensure that the vinyl does not slip out, one edge of the vinyl seal is enlarged to provide a bulb-type shape or bead. There are several features of this design that make it easier to both attach and unattach the canvas, and also make the attachment more secure than current types of vinyl seals.

Current types of removable vinyl seals operate by the use of a vinyl seal with an arrow-shaped protrusion that is inserted into a "C" shaped channel (a channel with a restricted opening). The width of the protrusion is larger than the opening or the side of the channel. As the vinyl is inserted, it must be deformed as it is pushed through the restricted opening. After the vinyl is in the channel, it returns to its original shape to resist removal. Since the vinyl must be deformed when it is inserted and removed, this method of attachment is more difficult to operate than the inventive assembly, which does not require that the vinyl be deformed. Deforming the vinyl becomes even more difficult when the weather is colder and the vinyl becomes stiff.

The new attachment assembly also provides a more secure attachment than existing methods. The assembly utilizes aluminum latches that rotate and restrict the opening of the channel. The harder the canvas is pulled upon, the harder the latches grip the vinyl and canvas. When the latches are released, they rotate and enlarge the effective opening on the channel so that the canvas can be easily inserted or removed. Prior structures will retain the canvas until the force becomes great enough to deform the vinyl seal.

DESCRIPTION OF THE DRAWING

The invention will be explained in conjunction with an illustrative embodiment shown in the accompanying drawing, in which

FIG. 4 is a fragmentary sectional view taken along the line 4—4 of FIG. 3;

FIG. 5 is an end view of the extruded aluminum rail;

FIG. 6 is an enlarged end view of one of the latches;

FIG. 7 is a fragmentary perspective view showing the canvas canopy in the process of being attached to the body;

FIG. 8 is a fragmentary perspective view showing the latch in an open or release position;

FIG. 9 is a fragmentary perspective view showing a latch in the latching position;

FIG. 10 is a fragmentary sectional view showing the vinyl seal which is sewn to the canvas;

FIG. 11 is a fragmentary sectional view showing the latch in the open position and the canvas and vinyl seal being inserted into the rail; and FIG. 12 is a view similar to FIG. 11 showing the latch in a latching position.

DESCRIPTION OF SPECIFIC EMBODIMENT

Figure 1:
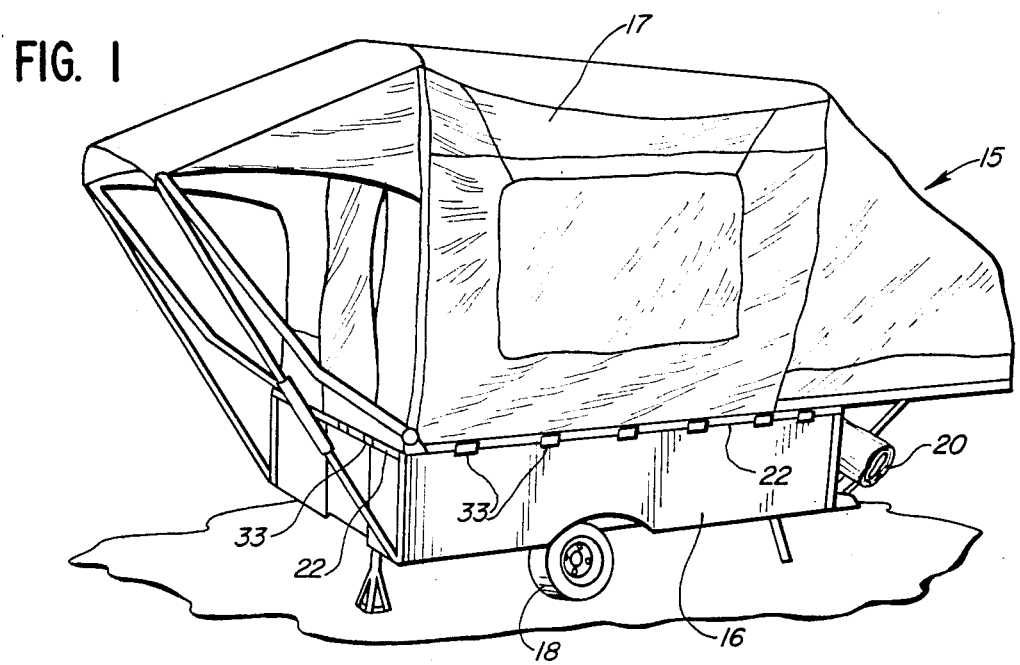
FIG. 1 is a perspective view of a camping trailer which is equipped with a canvas attaching assembly in accordance with the invention.
Figure 2:
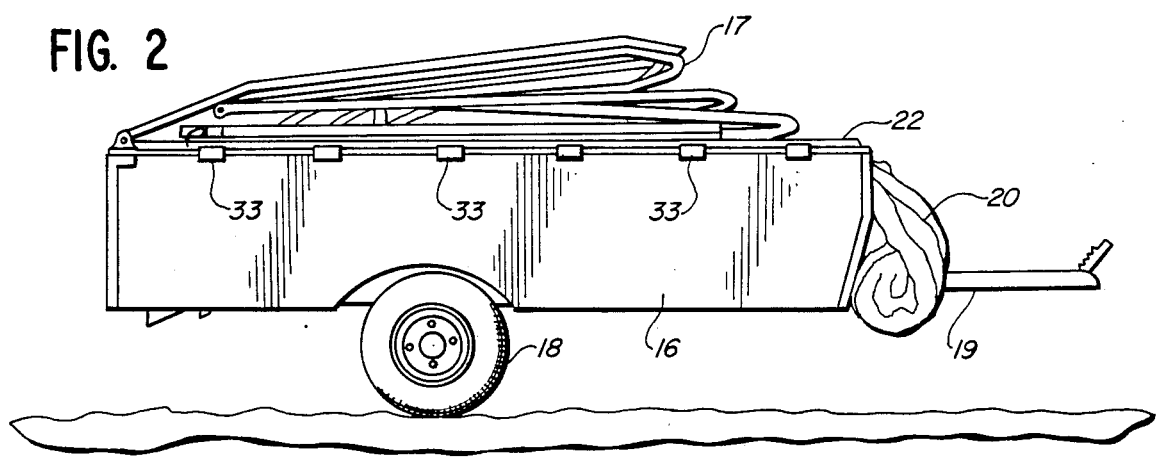
FIG. 2 is a side elevational view of the camping trailer showing the canvas canopy in a collapsed configuration.
Figure 3:
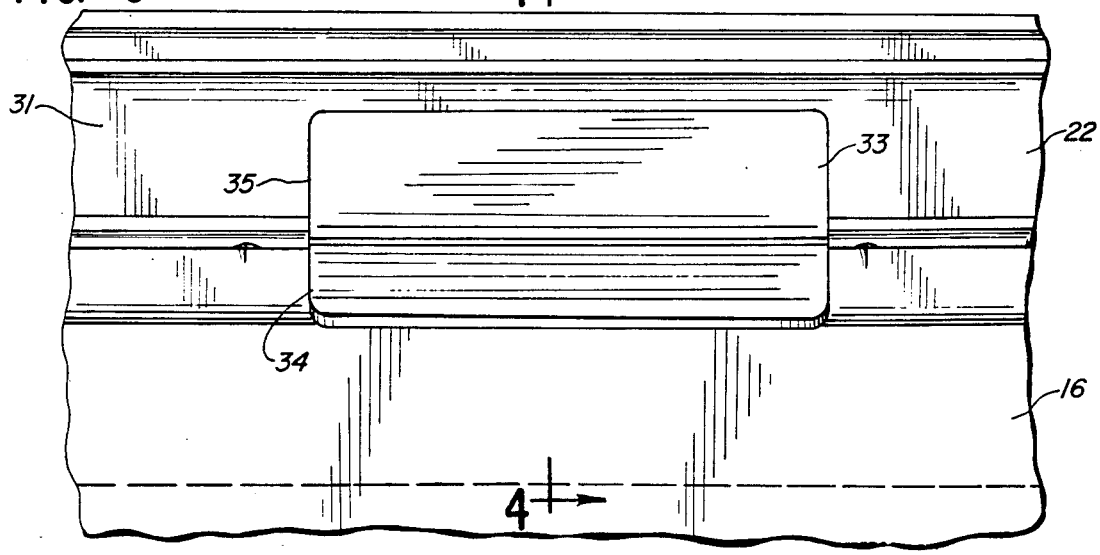
FIG. 3 is an enlarged fragmentary view of one of the latches.

Referring to FIGS. 1 and 2, the numeral 15 designates generally a camping trailer which includes a trailer body 16 and a canvas canopy 17. The trailer body 16 is supported by a pair of wheels 18, and a trailer hitch 19 on the trailer body enables the camping trailer to be towed behind a vehicle.

The canvas canopy 17 is shown in its open configuration in FIG. 1 in which it is supported by a conventional support frame to form an enclosure over the trailer body. The canopy is shown in its collapsed configuration in FIG. 2, and the canopy can be covered by a tarpaulin 20 which will protect the interior of the trailer body from rain and dirt while the trailer is being towed or stored. The support frame for the canopy can be conventional, and a detailed description thereof is unnecessary.

When the canvas canopy is supported in the use position illustrated in FIG. 1, the bottom edge of the canopy is attached to the top of the trailer body 16 in a manner which will be described in detail hereinafter. When the canopy is collapsed to the storage position shown in FIG. 2, the bottom edge of the canopy is detached from the trailer body.

Referring now to FIGS. 3–6, an extruded aluminum rail 22 is attached to the top of the trailer body 16 by screws 23 which are located on the inside of the trailer. The extruded aluminum rail 22 includes a horizontal wall 24 which abuts the top of the side wall of the trailer body, a pair of vertically downwardly extending flanges 25 and 26, a pair of generally L-shaped portions 27 and 28, and a vertically upwardly extending flange 29. A T-shaped rail 30 extends upwardly from the top of the L-shaped portion 27.

The extruded aluminum rail 22 is mounted on the side wall of the trailer body so that the flange 25 extends along the inside of the side wall of the trailer body and the flange 26 extends adjacent the outside of the side wall of the trailer body. The two L-shaped portions 27 and 28 form a generally C-shaped channel 31 into which the bottom edge of the canvas canopy can be inserted, and the L-shaped portion 28 and the upwardly extending flange 29 form a latch-retaining channel 32 for pivotally mounting and retaining a plurality of latches 33.

As can be seen best in FIG. 6, each latch 33 includes a generally S-shaped handle portion 34, a straight latching portion 35, and a cylindrical mounting portion 36 which is attached to the latching portion 35 by a straight wall 37. The diameter of the cylindrical mounting portion 36 of the latch is such that the mounting portion 36 can be slid into the end of the channel 32 in the aluminum rail 22 and can pivot freely in the channel 32. However, the L-shaped flange 28 which forms part of the channel 32 extends toward the flange 29 to provide the channel 32 with a restricted mouth which prevents the cylindrical mounting portion 36 of the latch from being withdrawn from the channel 32 through the mouth.

Referring now to FIG. 10, the bottom edge of the canvas canopy 17 is folded around an extruded vinyl seal 40, and the folded canvas and the vinyl seal are secured by stitching 41. The vinyl seal 40 includes a rounded tubular portion 42 and a tapered strip 43. The folded and stitched bottom edge of the canvas 17 provides the canvas with a hem 44, and the tubular portion 42 of the vinyl seal enlarges the cross section of the hem at the bottom thereof.

An extruded aluminum rail 22 is mounted on the top of each of the four side walls of the trailer body 16, and a vinyl strip 40 is stitched into the bottom hem of each of the canvas panels which form the four sides of the canvas canopy. A plurality of latches 33 are slidably and pivotally mounted on each of the rails 22, and the latches are preferably spaced about 12 to 16 inches apart along the length of the rail.

When it is desired to attach the canvas to the rail 22, each of the latches 33 is pivoted by pulling upwardly on the handle portion 34 to move the latching portion 33 to a generally horizontal position as illustrated in FIG. 11. When the latch is in the horizontal or unlatched position, the mouth of the channel 31 of the rail is open, and the hem 44 of the canvas can be inserted into the channel 31 as shown in FIG. 11. Thereafter, the handle portion 34 of the latch is pivoted downwardly as indicated by the arrow A in FIG. 11 to move the end of the latching portion 33 past the tubular portion 42 of the vinyl seal within the hem of the canvas. When the latch 33 is rotated to its latching position illustrated in FIG. 12, the distance between the end of the latching portion 35 and the L-shaped portion 27 of the rail 22 is less than the diameter of the tubular portion 42 of the vinyl seal 40, and the bottom edge of the canvas 17 will be retained within the channel 31 by the latch. If the canvas 17 is pulled outwardly, the tapered strip 43 of the vinyl seal 40 will wedge between the end of the latching portion 35 of the latch and the L-shaped portion 27 of the rail 22, and the gripping force on the canvas will be increased.

When it is desired to detach the canvas canopy 17 from the rails 22, the latches 33 are pivoted to the horizontal or unlatched position illustrated in FIG. 11. The hem of the canvas and the vinyl seal 40 contained therein can then be freely withdrawn from the channel 31 of the rail.

The tarpaulin 20 which is used to cover the trailer when the canopy is folded can also be attached to the rails 22 in the same way. A vinyl seal 40 can be stitched into the hem of the tarpaulin to permit the hem to be releasably retained within the channel 31 of the rail.

While the specific embodiment of the attaching assembly which is described herein is used for attaching the canvas canopy of a camping trailer, the attaching assembly can be used to releasably attach any sheet-like material. Accordingly, the term "canvas" as used herein broadly includes any type of sheet-like material.

While in the foregoing specification a detailed description of a specific embodiment of the invention was set forth for the purpose of illustration, it will be understood that many of the details herein given may be varied considerably by those skilled in the art without departing from the spirit and scope of the invention.

I claim:

1. A canvas retaining assembly for a camping trailer, the camping trailer having a trailer body including at least one side wall, the canvas retaining assembly comprising a canvas canopy covering the trailer body, an elongated channel mounted on the top of the side wall and having a top wall and a side opening below the top wall, the canvas canopy having a bottom edge portion which extends through the side opening in the channel and a generally flat portion which extends upwardly from the edge portion and which engages the top wall of the channel, and a latch pivotally mounted on the channel adjacent the mouth of the side opening therein and having a latching portion which extends from the pivot axis of the latch into the side opening in the channel, the latch being pivotable between an unlatched position in which the latching portion is spaced from said top wall of the channel a distance sufficiently to permit the edge portion of the canvas to be inserted laterally into and withdrawn laterally from the channel through said side opening and a latching position in which the latching portion is spaced from said top wall of the channel a distance less than the thickness of the edge portion and the edge portion is positioned in the side opening in the channel inwardly of the pivot axis of the latch so that the edge portion wedges between the latching portion and said top wall and is prevented from being withdrawn from the channel.

2. An attaching assembly for canvas or other sheet-like material, the canvas having an edge portion which is thicker than the thickness of the canvas, a rail having a channel into which the edge portion of the canvas can be inserted, and a latch pivotally mounted on the rail, the latch being pivotable between an unlatched position in which the edge portion of the canvas can be inserted into and withdrawn from the channel and a latching position in which the latch restricts the opening of the channel and prevents the edge portion of the canvas from being withdrawn from the channel, the rail including a generally flat wall, a first generally L-shaped wall extending upwardly from the flat wall to provide said channel, a latch-retaining flange extending upwardly from the flat wall, and a second generally L-shaped wall extending upwardly from the flat wall adjacent the latch-retaining flange to provide a latch-retaining channel, the latch including a mounting portion which is pivotally mounted in the latch-retaining channel.

3. The assembly of claim 2 in which the mounting portion of the latch is generally cylindrical and the latch includes a latch portion which extends into the first-mentioned channel in the rail and a handle portion which extends outwardly from the rail whereby the latch can be pivoted by moving the handle portion.

4. The assembly of claim 2 in which the distance between the latch and the first generally L-shaped wall when the latch is in the latching position is less than the thickness of said edge portion of the canvas.

5. An attaching assembly in combination with canvas or other sheet-like material comprising a sheet of sheet-like material having an edge portion which is thicker than the thickness of the sheet, a rail having an elongated channel with a pair of spaced-apart sides which provide a latched opening in the channel, the edge portion of the sheet being positioned in the channel, and a latch pivotally mounted on the rail adjacent the mouth of the opening therein and having a latching portion which extends from the pivot axis of the latch into the opening in the channel, the latch being pivotable between an unlatched position in which the latching portion is spaced from one of the sides of the channel a distance sufficient to permit the edge portion of the canvas to be inserted laterally into and withdrawn laterally from the channel through said lateral opening and a latching position in which the latching portion is spaced from said one side of the channel a distance less than the thickness of the edge portion and the edge portion is positioned in the opening in the channel inwardly of the pivot axis of the latch so that the edge portion wedges between the latching portion and said one side of the channel and is prevented from being withdrawn laterally from the channel.

6. The assembly of claim 5 in which the canvas includes a generally flat portion which extends angularly from the edge portion of the canvas against said one side edge of the channel.

7. The assembly of claim 5 in which the length of the latch in the longitudinal direction of the channel is less than the length of the channel and the assembly includes a plurality of said latches pivotally mounted on the rail.

8. The assembly of claim 5 including a seal member attached to the edge portion of the canvas, the seal member including a tubular portion which enlarges the thickness of the edge portion.

9. The assembly of claim 5 including a seal member having a tubular portion and an attaching portion extending from the tubular portion, the canvas being folded over the seal member and stitched thereto to provide said edge portion of the canvas.

10. The assembly of claim 9 in which the seal member is extruded from vinyl.

11. The assembly of claim 5 in which the rail is provided with a second channnel and the latch includes a mounting portion which is pivotally mounted in the second channel.

12. The assembly of claim 11 in which the mounting portion of the latch is generally cylindrical and the latch includes a latch portion which extends into the first-mentioned channel in the rail and a handle which extends outwardly from the rail whereby the latch can be pivoted by moving the handle portion.

* * * * *